United States Patent
Wante et al.

(10) Patent No.: US 7,263,609 B1
(45) Date of Patent: Aug. 28, 2007

(54) METHOD AND APPARATUS FOR PACKET QUARANTINE PROCESSING OVER A SECURE CONNECTION

(75) Inventors: Kenneth John Wante, Bellingham, MA (US); Richard Wade, Mansfield, MA (US)

(73) Assignee: Cisco Technology, Inc., San Jose, CA (US)

( * ) Notice: Subject to any disclaimer, the term of this patent is extended or adjusted under 35 U.S.C. 154(b) by 708 days.

(21) Appl. No.: 10/425,549

(22) Filed: Apr. 29, 2003

(51) Int. Cl.
*H04L 12/54* (2006.01)
*H04L 12/56* (2006.01)
*H04L 29/02* (2006.01)

(52) U.S. Cl. .................. 713/160; 713/162; 713/154

(58) Field of Classification Search .............. 713/160, 713/162, 154
See application file for complete search history.

(56) References Cited

U.S. PATENT DOCUMENTS

| | | | |
|---|---|---|---|
| 6,442,696 B1 | 8/2002 | Wray et al. ............... 713/201 |
| 6,505,192 B1 * | 1/2003 | Godwin et al. ................ 707/3 |
| 6,609,196 B1 | 8/2003 | Dickinson, III et al. .... 713/154 |
| 6,651,063 B1 | 11/2003 | Vorobiev .................... 707/10 |
| 6,920,493 B1 * | 7/2005 | Schwab ..................... 709/223 |

* cited by examiner

*Primary Examiner*—Gilberto Barrón, Jr.
*Assistant Examiner*—Venkat Perungavoor
(74) *Attorney, Agent, or Firm*—BainwoodHuang (57) ABSTRACT

A packet quarantine device receives a data packet over a secure connection having a connection-specific set of security parameters such as an IPsec connection in a virtual private network (VPN) using security associations. The packet quarantine device tests the data packet and if the data packet fails to validate, the packet quarantine device saves the data packet to a storage area along with the set of security parameters used to transmit the data packet. The stored information of the failed packet along with the set of security parameters enables later analysis of the failed packet in order to determine the network condition that produced the failed data packet. The packet quarantine device also generates alerts in response to receiving data packets that fail to validate. The alerts include information obtained from packet analysis.

18 Claims, 5 Drawing Sheets

METHOD AND APPARATUS FOR PACKET QUARANTINE PROCESSING OVER A SECURE CONNECTION

BACKGROUND

In a secure connection, such as a connection in a virtual private network (VPN), transmitted packets are secured by a set of security parameters. One standard used to secure packets in a secure connection is Internet Protocol Security (IPsec), developed by the Internet Engineering Task Force (IETF). IPsec is a suite of protocols that supports the secure exchange of packets at the Internet Protocol network layer (Layer 3 of the Open Systems Interconnection (OSI) network model).

IPsec secures data in a connection through the use of security associations (SAs). An SA is a combination of a policy and keys used to establish a simplex (i.e., one-way) secure connection that provides security services to the packets carried on the secure connection. Typically, two SAs are negotiated for an IPsec connection between two computing devices, one for inbound communications and one for outbound communications. Each SA includes values such as a destination address, data exchange policies, security keys for encryption of IPsec packets, and additional attributes such as SA lifespan. Each SA further includes a security parameters index (SPI) which is a unique, identifying value carried by each SA and is used to distinguish multiple SAs that may coexist at a computing device.

To build an IPsec connection between the two computing devices, the IETF has established a standard method of security association and key exchange resolution, which combines the Internet Security Association and Key Management Protocol (ISAKMP) and the Oakley key generation protocol. ISAKMP centralizes security association management, reducing connection time. Oakley generates and manages authenticated keys used to secure the information.

To ensure successful, secure communication, the ISAKMP/Oakley method involves a two-phase operation. The first phase is a first key exchange phase during which the two computing devices establish a secure exchange of first policies and first keys for exchanging SA data securely in the second phase. The second phase is a data protection phase during which the SA policies and SA keys are exchanged using the secure exchange established during the first phase. In the second phase, a pair of SAs are negotiated, one SA for each data transmission direction. The security negotiation process during the second phase includes policy negotiation which determines the IPsec protocol (e.g., Authentication Header protocol (AH) or Encapsulation Security Protocol (ESP)), an integrity algorithm (e.g., Message Digest algorithm (MD5), or Secure Hash algorithm (SHA)), and an encryption algorithm (e.g., Data Encryption Standard (DES), Triple Data Encryption Standard (3DES), or 40-bit Data Encryption Standard (40 bitDES)). In sum, each SA includes a number of policies and keys governing the transmission of packets over the secure connection. The two computing devices come to a common agreement about the policies and keys and, thus, establish the SAs for an IPsec connection.

Each SA has a lifespan, that is, a time period after which the two computing devices need to renegotiate the SA. The renegotiation involves renegotiating policies and keys. The computing device typically deletes old SA policies and keys after negotiating new SAs.

Packets sent through a VPN tunnel created by an IPsec connection are typically forwarded through an intermediate device which partially decrypts the packet in order to determine a packet destination. The intermediate device also typically validates the packet. Packets failing to validate are typically dropped with no further processing and, accordingly, provide little data for later analysis of the network condition that produced the failed packets.

SUMMARY OF THE INVENTION

Conventional computer network technology does not save packets transmitted over a secure connection that fail validation. The result is that the data contained in these packets is not available for later network analysis. Typically, failed packets in a secure connection are dropped.

A receiving device can save the failed packets, however, the packets alone do not provide enough data for packet analysis. Packets sent over a secure connection such as an IPsec connection are protected and encrypted according to the policies and keys of the SA in place at the time the packet was transmitted. In order to analyze the packet, the receiving device needs that particular SA information. The SA information, however, is typically unavailable as SAs expire and are replaced in a relatively short period of time. Without the SA information, the saved packet cannot be analyzed. This results in an inability to analyze network failure conditions that produced the failed packets even when the packets are retained. It remains desirable to have a method and apparatus capable of saving failed packets in such a way that they can be analyzed for network failure conditions.

Embodiments of the present invention significantly overcome the deficiencies described above and provide methods and apparatus for packet quarantine processing over a secure connection. A packet quarantine device receives a data packet over a secure connection having a connection-specific set of security parameters, such as an IPsec connection using security associations. The packet quarantine device tests the packet and if the packet fails to validate, the packet quarantine device saves the packet to a storage area along with the security association used to transmit the packet. The stored security association enables later decryption of the packet for analysis. In addition, the packet quarantine device formulates alerts using information obtained from an initial analysis of failed packets. This initial analysis is made of headers of failed packets. In a first embodiment, the packet quarantine device transmits the alert to a packet forwarding device. The alert includes instructions to the forwarding device to cease forwarding packets from particular sender devices as discovered by packet header analysis. In another embodiment, the packet quarantine device sends an alert to a packet receiver alerting the packet receiver to the presence of packets from particular senders as discovered by packet header analysis. The packet receiver can use the information from the alert to stop accepting packets from those senders or to communicate to those senders a request that transmission be halted.

More specifically, embodiments of the invention provide methods and apparatus for packet quarantine processing over a secure connection. One such method embodiment is implemented in a packet quarantine device and includes the step of receiving, at the packet quarantine device, a datagram (e.g., a packet) over a secure connection using a connection-specific set of security parameters. The packet quarantine device then performs a validation test on the datagram. If the datagram fails the validation test, the packet quarantine device then saves the datagram in association with the set of security parameters to a storage device. It is then possible for a separate analyzer device to analyze the datagrams later because the formatting and encryption data needed to extract information from the datagrams is available through the stored security parameters.

In an alternative embodiment of the invention, the datagram is an Internet Protocol Security packet and the set of security parameters is a security association negotiated between a sending device and a receiving device. The packet quarantine device is able to handle this standard used commonly in virtual private networks.

In another embodiment of the invention, the packet quarantine device receives a plurality of datagrams over a secure connection governed by a set of security parameters. The packet quarantine device validates the plurality of datagrams and saves the failed datagrams in association with the set of security parameters in the storage device. The packet quarantine device thus stores failed datagrams efficiently in the storage device.

In another embodiment of the invention, the packet quarantine device receives datagrams over a secure connection governed by a plurality of sets of security parameters. The packet quarantine device receives a first datagram under a first set of security parameters and stores that first datagram in association with the first set of security parameters if the first datagram is invalid. The packet quarantine device then receives a second datagram under a second set of security parameters and stores that second datagram in association with the second set of security parameters if the second datagram is invalid. The second set of security parameters is also stored in association with the first set of security parameters. The sets of security parameters governing the secure connection are linked and information needed to analyze related datagrams is readily available.

In another embodiment of the invention, the packet quarantine device performs an initial analysis on a failed datagram. The packet quarantine device then generates an alert based on the initial analysis of the failed datagram. In a first arrangement, the packet quarantine device sends the alert to a sending device instructing the sending device to filter datagrams having a specified Internet Protocol Address. In a second arrangement, the packet quarantine device sends the alert to the sending device instructing the sending device to filter datagrams having a specified Media Access Control address. The generation of an alert from an initial analysis of a failed datagram enables the packet quarantine device to minimize or stop network attacks quickly.

In another embodiment of the invention, the packet quarantine device receives datagrams over a virtual private network tunnel. In an alternative arrangement of this embodiment, the packet quarantine device is part of a network concentrator receiving datagrams from a hardware client in a virtual private network. In a further alternative arrangement, the packet quarantine device decrypts a portion of a received datagram and validates an inner header of the datagram. With these capabilities, the packet quarantine device is fully capable of operating in virtual private network using the IPsec standard.

In another embodiment of the invention, a system provides network security. The system includes an interface device to receive a datagram over a connection using a connection-specific set of security parameters. The system further includes a validation device coupled to the interface device where the validation device performs a validation test on the datagram. The system further includes an exception device coupled to the validation device where the exception device receives the datagram from the validation device if the datagram fails the validation test. The exception device saves the datagram in association with the set of security parameters to a storage device. Failed datagrams are thus available for later analysis as the availability of the sets of security parameters governing transmission over the connection enables a data analyzer to extract all data from the failed datagrams. The extracted data is useful for determining the network conditions causing the failed datagrams.

In another embodiment of the invention, the system providing network protection streams a failed datagram in association with the set of security parameters to a storage device. Streaming enables the system to transmit data rapidly to the storage device so that the data is quickly accessible for analysis.

In another embodiment of the invention, a network security system includes a client to receive a data packet from a sending device and a packet quarantine device connected to the client by a connection using a connection-specific set of security parameters. The packet quarantine device receives the data packet from the client. The packet quarantine device then validates the packet and saves the data packet and the connection-specific set of security parameters in association to a storage device if the packet fails validation. The packet quarantine device further analyzes the packet and provides an alert including packet filtering information to the client from the results of analyzing the packet. In this way, the packet quarantine device acts with the client to protect the network from network attacks.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

A packet quarantine device receives a data packet over a secure connection having a connection-specific set of security parameters, such as an IPsec connection in a virtual private network (VPN) using security associations. The packet quarantine device tests the data packet and if the data packet fails to validate, i.e., fails the test, the packet quarantine device saves the data packet to a storage area along with the set of security parameters used to transmit the data packet. The stored information of the failed packet along with the set of security parameters enables later analysis of the failed packet in order to determine the network condition that produced the failed data packet. The packet quarantine device also generates alerts in response to receiving data packets that fail to validate. The alerts include information obtained from packet analysis.

Figure 1:
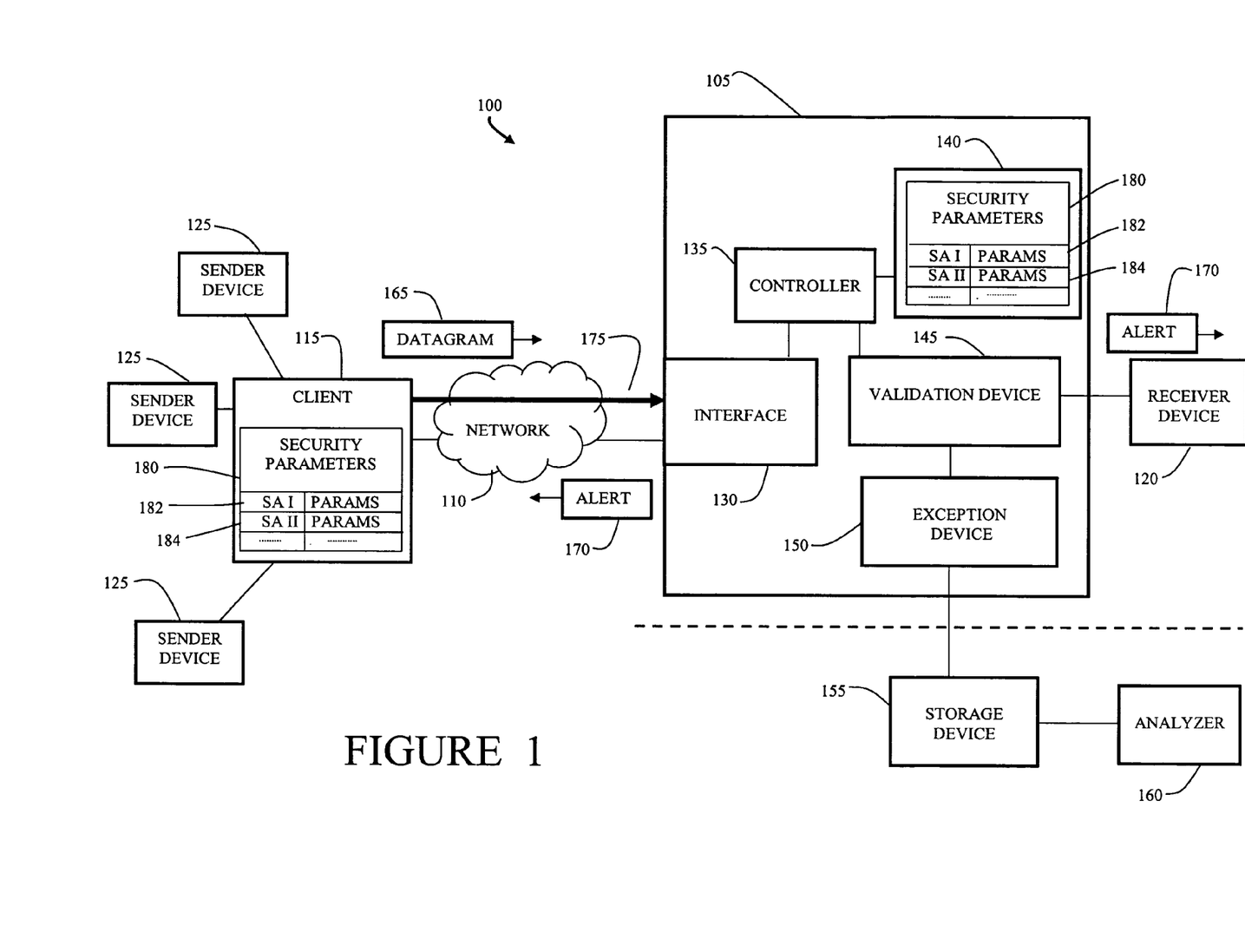
FIG. 1 is a block diagram of a computer network including a packet quarantine device that operates according to the principles of the present invention.

FIG. 1 is a block diagram of a network environment 100 including a packet quarantine device 105 operating according to principles of the present invention. The packet quarantine device 105 includes a network interface 130, a controller 135, a memory 140, a validation device 145, and an exception device 150. The validation device 145 is, for example, a cryptography processor. The memory 140 holds sets of security parameters 180 which are, in this example embodiment, security associations 182, 184.

The packet quarantine device 105 is in communication with a client 115 through a network 110. The client 115 is connected to a plurality of sender devices 125. The client 115 also holds the sets of security parameters 180, the security associations 182, 184.

The sender devices 125 send datagrams 165, which in this example embodiment, are data packets. In alternative embodiments of the invention, however, the datagrams 165 may be messages, cells, or some other type of data configuration. The present invention is not limited to data packets.

The client 115 is a type of computerized device that enables a secure network connection, such as a virtual private network (VPN) tunnel, for a plurality of computers, which in this example embodiment, are the sender devices 125. The client 115 establishes a secure connection 175, such as a VPN tunnel, to the packet quarantine device 105. The secure connection 175 is established and governed by one or more of the security associations 182, 184, which are negotiated between the client 115 and the packet quarantine device 105. Each security association 182, 184 has a set of parameters including policies and keys that govern the transmission of the data packet 165 over the secure connection 175. The security associations 182, 184 have lifespans. A first security association 182 is replaced by a renegotiated second security association 184 when the lifespan of the first security association 182 has expired.

The packet quarantine device 105 is also connected to a receiver device 120 configured to communicate with the sender devices 125. The packet quarantine device 105 is further connected to a storage device 155 that in turn is connected to an analyzer 160.

In operation, the client 115 forwards a data packet 165 received from one of the sender devices 125 across the network 110 over the secure connection 175 to the packet quarantine device 105. As described above, the secure connection 175 in the present embodiment of the invention is a VPN tunnel using the IPsec standard. Accordingly, the secure connection 175 is established through the use of the security associations (SAs) 182, 184. Each data packet 165 is formatted and encrypted according to the security association 182, 184 in place at the time that the data packet 165 is transmitted by the client 115.

The packet quarantine device 105 receives the data packet 165 at the interface 130. The controller 135, in conjunction with the memory 140, operates to forward the data packet 165 from the interface 130 to the validation device 145. The validation device 145 runs a validation test on the packet 165. Typically, the validation device 145 partially decrypts the packet 165 using the keys from the negotiated SA 182 in order to use packet headers for validation. Packets sent over IPsec connections have inner and outer headers. The validation device 165 tests both the inner and the outer headers of the data packet 165 in the embodiment of the invention using IPsec for the secure connection 175. Testing for validation of an IPsec packet is an IPsec Encapsulating Security payload (ESP) tunnel mode inner header policy check. The IPsec ESP tunnel mode inner header policy check verifies that packets carried within the IPsec tunnel are from a source IP, from a source port, to a destination IP, to a destination port and include a protocol negotiated in the security association governing the tunnel. If the data packet 165 is valid, the validation device 145 forwards the data packet 165 to the receiver device 120. If the data packet 165 fails to validate when the validation device 145 tests the data packet 165, the validation device 145 sends the failed packet 165 to the exception device 150. In an alternative embodiment, the validation device 145 includes a status indicator with the failed packet 165 sent to the exception device 150 where the status indicator labels the packet 165 as invalid.

The exception device 150 receives the failed packet 165 from the validation device 145. In a first embodiment of the invention, the exception device 150 stores the failed packet 165, along with the security association 182 governing packet transmission across the secure connection 175, to the storage device 155. In a second embodiment of the invention, the exception device 150 also performs an initial analysis on the failed packet 165. The decrypted headers of the failed packet 165 provide information, such as the identity of the sender device 125 (e.g., source IP address or source port number), the packet destination (e.g., destination IP address or destination port number), and data flow information, that can be used identify a source of network problems, such as a sender device 125 sending invalid packets 165. The exception device 150 generates an alert 170 based on the information resulting from the initial analysis of the failed packet 165. In a first alternative arrangement of the second embodiment of the invention, the exception device 150 sends the alert 170 to the client 115, for example, instructing the client 115 to stop forwarding packets from a particular sender device 125. In a second alternative arrangement of the second embodiment of the invention, the exception device 150 sends the alert 170 to the receiver device 120, for example, warning the receiver device 120 not to accept data packets from particular network addresses or from particular data flows. These are merely two examples of types of alerts 170 that may be generated in response to an initial analysis of the failed data packet 165. Other types of alerts 170 are possible within the scope of the invention. In a third embodiment of the invention, the exception device 150 streams the data of the failed packet 165 and the associated security association 182 to the storage device 155.

The storage device 155 in the present invention is a persistent storage device, such as a hard drive. The invention, however, is not limited to hard drives. The failed data packet 165 stored in the storage device 155 is not forwarded to its intended destination and is instead "quarantined." In another embodiment of the invention, the storage device 155 is isolated from the rest of the network environment 100 to further secure the network environment 100 from invalid data packets 165.

The analyzer 160 examines the failed data packet 165 stored in the storage device 155 to analyze the received packets for network error conditions. With the availability of the information from the security association 182, the analyzer 160 is able to fully decrypt and extract data from the failed packets in the storage device 155. Without the associated security association 182 used to transmit the data packet 165, the analyzer 160 cannot decrypt the data packet 165. Because security associations have lifespans, the security association 182 needs to be saved with the failed data packet 165 in order to ensure that the security association 182 is available to the analyzer 160.

Figure 2:
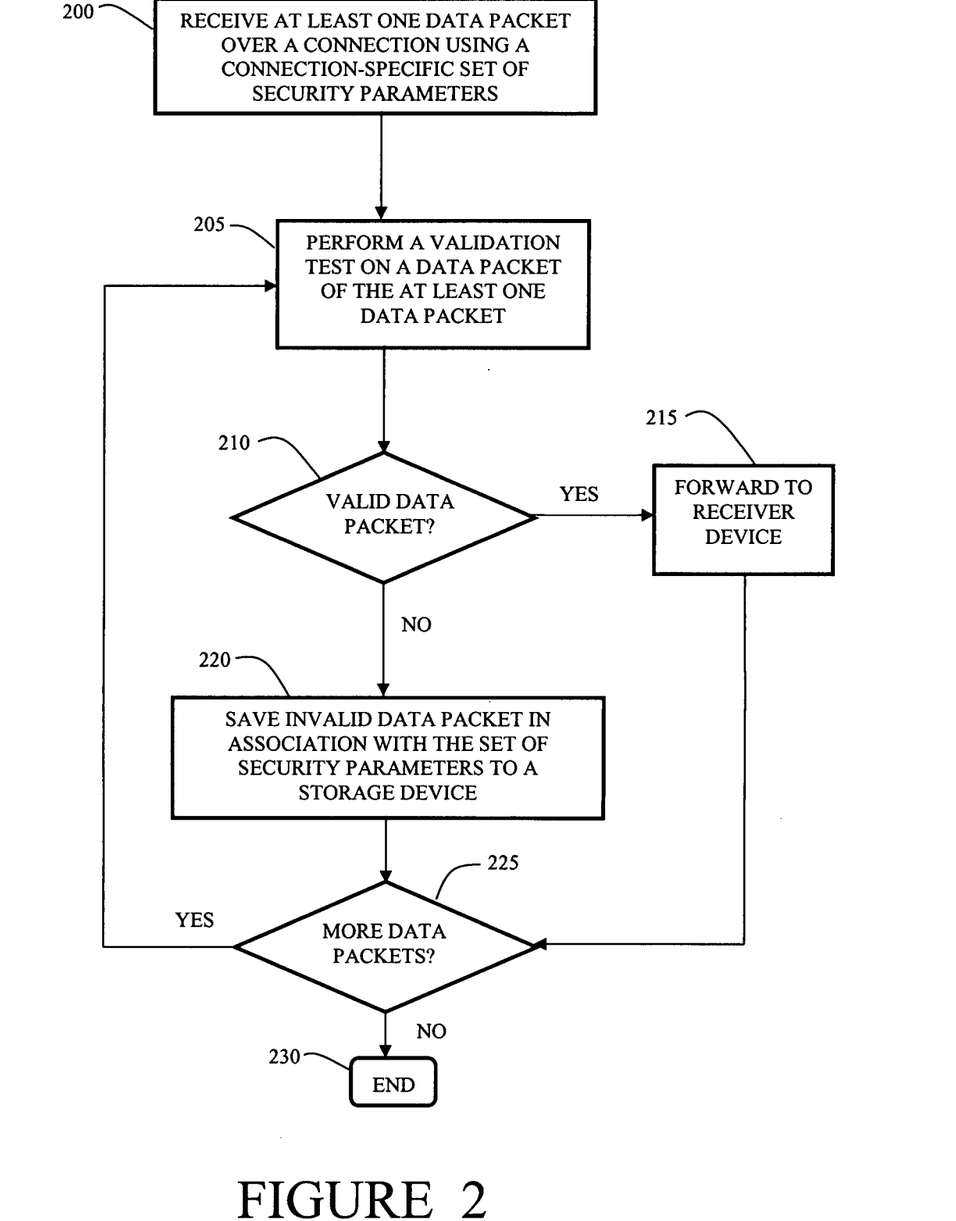
FIG. 2 is a flow chart of the operation of the packet quarantine device of FIG. 1.

FIG. 2 is a flow chart of the operation of the packet quarantine device 105. At step 200, the packet quarantine device 105 receives at least one datagram 165, in this example, at least one data packet 165, over the secure connection 175 using a connection-specific set of security parameters 180. In this embodiment of the invention, the secure connection 175 is a tunnel established using the IPsec standard. Accordingly, the secure connection 175 is governed by a security association 182. As illustrated in FIG. 1, the sender device 125 send the data packet 165 to the client device 115. The client device 115 in turn forwards the data packet 165 to the receiver device 120. The packet quarantine device 105 intercepts the data packet 165.

At step 205, the packet quarantine device 105 performs a validation test on a data packet of the at least one data packet 165. Generally, validation requires that the data packet 165 be partially decrypted. The packet quarantine device 105 typically decrypts the packet headers of the at least one data packet 165 and then performs the validation test on the packet headers.

At step 210, the packet quarantine device 105 determines, from the results of the validation test, whether or not the data packet 165 is valid. If the data packet 165 is valid, step 210 proceeds to step 215. If the data packet is not valid, step 210 proceeds to step 220.

At step 215, the packet quarantine device 105 has determined that the data packet 165 is valid and forwards the data packet 165 to the receiver device 120. The packet quarantine device 105 then proceeds to step 225 to check for more received data packets 165.

At step 220, the packet quarantine device 105 has determined that the data packet 165 is invalid and saves the invalid data packet 165 in association with the connection-specific set of security parameters, in this example, the security association 182, to the storage device 155. If additional data packets 165 are discovered by the packet quarantine device 105 to be invalid, the packet quarantine device 105 saves the additional invalid data packets 165 to the storage device 155 in association with the already-saved security association 182. One example of a data structure for saving a plurality of invalid data packets 165 with a security association 182 in the storage device 155 is a record having the security association 182 and a list of the invalid data packets 165 transmitted over the secure connection 175 under that security association 182.

At step 225, the packet quarantine device 105 checks for remaining data packets 165 received over the secure connection 175. If there are more data packets 165 to be validated, the packet quarantine device 105 returns to step 205 to validate a next data packet 165. If there are no more data packets 165, the process ends, step 230.

Figure 3:
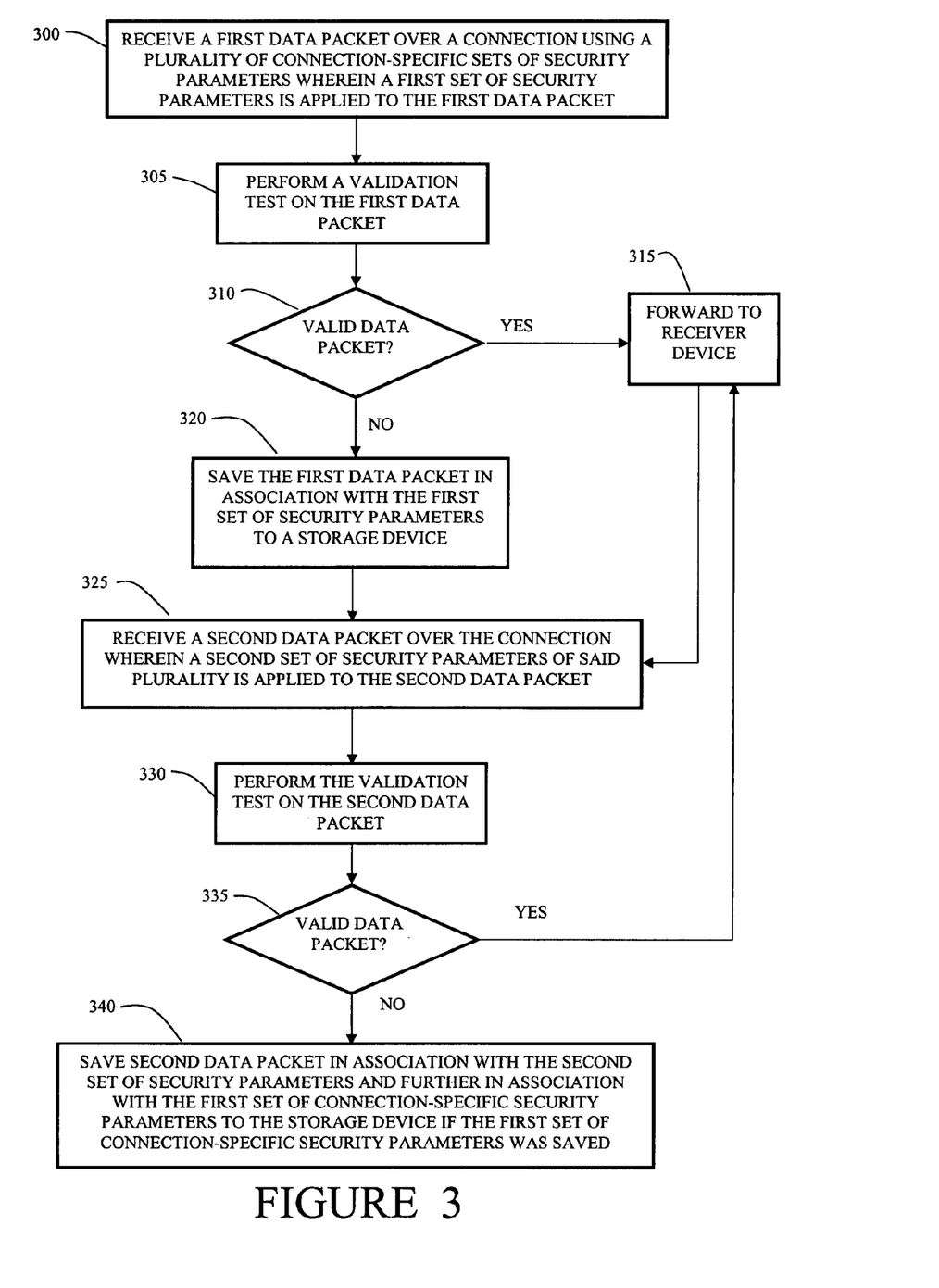
FIG. 3 is a flow chart of the operation of the packet quarantine device of FIG. 1 operating under a plurality of sets of security parameters.

FIG. 3 is a flow chart of the operation of the packet quarantine device 105 where the secure connection 175 has a plurality of sets of security parameters. In IPsec, the sets of security parameters 180 are security associations 182, 184. The security associations 182, 184 negotiated between computing devices expire after a specified time period. There is typically a grace period (e.g., a transition period) where the old security association 182 and the new security association 184 are available over one secure connection. Even with the grace period, the client 115 can transmit related data packets 165 over the secure connection 175 under different security associations 182, 184. Accordingly, during validation testing, the packet quarantine device 105 detects related failed data packets 165 associated with different security associations 182, 184. It is useful to have a method that relates the different security associations 182, 184 in the storage device 155. In this example, the packet quarantine device 105 receives first and second data packets 165 that are related to each other. The first data packet, however, is transmitted using a first security association 182 and the second data packet is transmitted under a second security association 184.

At step 300, the packet quarantine device 105 receives a first datagram 165 over the secure connection 175 using a plurality of connection specific sets of security parameters. The example of the IPsec standard is continued here. Accordingly, the secure connection 175 is an IPsec-enabled connection and is governed in this case by a plurality of security associations 182, 184. The plurality of datagrams 165, in one arrangement, is a plurality of data packets 165. The packet quarantine device 105 receives the first data packet 165 over the secure connection 175 using a first security association 182 of the plurality of security associations 182.

At step 305, the packet quarantine device 105 performs a validation test on the first data packet 165, as described above with regard to FIG. 2.

At step 310, the packet quarantine device 105 detects, from the results of the validation test, whether or not the first data packet is valid.

At step 315, the packet quarantine device 105 has determined that the first data packet 165 was valid, and forwards the first data packet to receiver device 120. The packet quarantine device 105 then continues to step 325.

At step 320, the packet quarantine device 105 has determined that the first data packet 165 was invalid. The packet quarantine device 105 saves the first data packet 165 in association with the first security association 182 to the storage device 155 as described above with regard to FIG. 2.

At step 325, the packet quarantine device 105 receives a second data packet 165 over the secure connection 175. In the time period between receiving the first data packet 165 and the second data packet 165, the first security association 182 governing the secure connection 175 expired and a second security association 184 replaced it. The second data packet 165 is therefore transmitted under the second security association 184.

At step 330, the packet quarantine device 105 performs a validation test on the second data packet 165.

At step 335, the packet quarantine device 105 determines from the results of the validation test whether or not the second data packet 165 is valid. If the second data packet 165 is valid, the packet quarantine device 105 proceeds to step 315 and forwards the second data packet 165 to the receiver device 120.

At step 340, the packet quarantine device 105 has determined that the second data packet 165 is invalid. The packet quarantine device 105 saves the second data packet 165 in association with the second security association 184 and further in association with the first set of connection-specific first security association 182 into the storage device 155 if the first security association 182 was saved.

Figure 4:
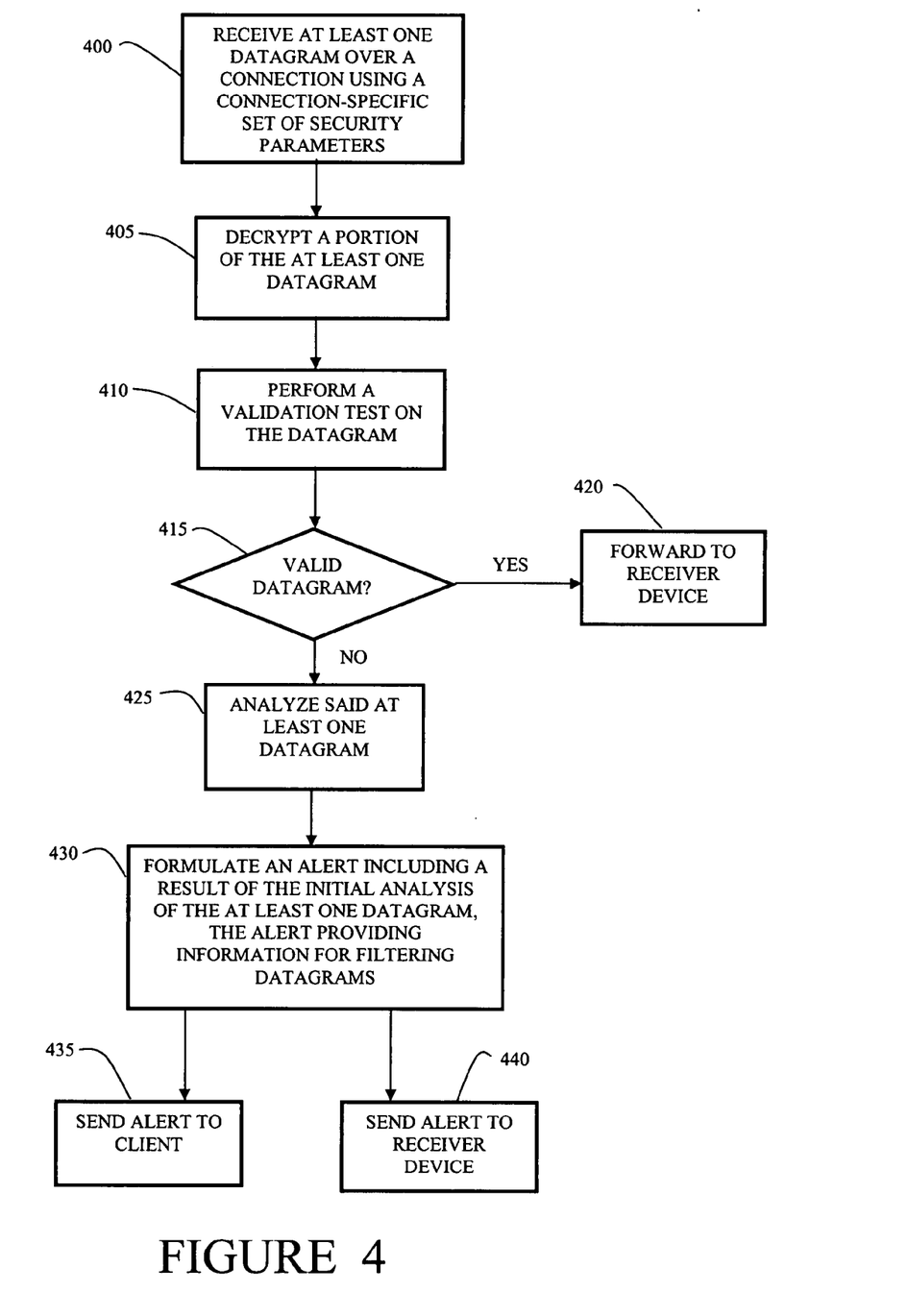
FIG. 4 is a flow chart of the operation of the packet quarantine device of FIG. 1 in generating alerts from an initial analysis of failed packets.

FIG. 4 is a flow chart of the operation of the packet quarantine device 105 performing an initial analysis on transmitted packets and generating alerts including information obtained from the analysis. In this embodiment of the invention, the exception device 150 not only binds together failed data packets 165 and security associations 180 and stores them in the storage device 155, but also performs an initial analysis of the data packets 165 and generates alerts 170. The initial analysis is typically performed on the decrypted headers of the data packets 165.

At step 400, the packet quarantine device 105 receives at least one datagram 165 over the secure connection 175 using a connection-specific set of parameters 180.

At step 405, the packet quarantine device 105 decrypts a portion of the at least one datagram 165.

At step 410, the packet quarantine device 105 performs a validation test on the at least one datagram 165.

At step 415, the packet quarantine device 105 determines from the results of the validation test whether the datagram 165 is valid.

At step 420, the packet quarantine device 105 has determined that the datagram 165 is valid and forwards the datagram 165 to the receiver device 120.

At step 425, the packet quarantine device 105 has determined that the datagram 165 is invalid and analyzes the datagram 165. In the case where the datagrams 165 are data packets, the packet headers are analyzed. Packet headers contain information about, for example, the sender device 125 such as the Media Access Control (MAC) address or IP address, the destination device, and flow. This information can be used to formulate an alert 170 warning of suspect data.

At step 430, the packet quarantine device 105 formulates an alert 170 including information resulting from the initial analysis from step 425. The information in the alert 170 includes information such as the IP address or MAC address of a sender device 125 suspected of sending invalid data packets indicating that there may be a network attack originating from the sender device 125. Alternatively, the information in the alert 170 includes the flow to which the invalid data packet 165 belongs. The information in the alert 170 can be used by a device receiving the alert 170 to filter datagrams 165.

In one embodiment, step 435, the packet quarantine device 105 sends the alert 170 to the client 115. The client 115 uses the alert information to filter datagrams 165 from a particular sender device 125.

In another embodiment, step 440, an alternative embodiment to step 435, the packet quarantine device 105 sends the alert 170 to the receiver device 120. The receiver device 120 uses the alert information to instruct particular sender devices 125 to stop sending datagrams 165. In an alternative embodiment, the receiver device 120 uses the alert information to reject datagrams 165 from a particular flow.

As mentioned above, the invention is not limited to the alerts described in FIG. 4. Other types of alerts are within the scope of the invention.

Figure 5:
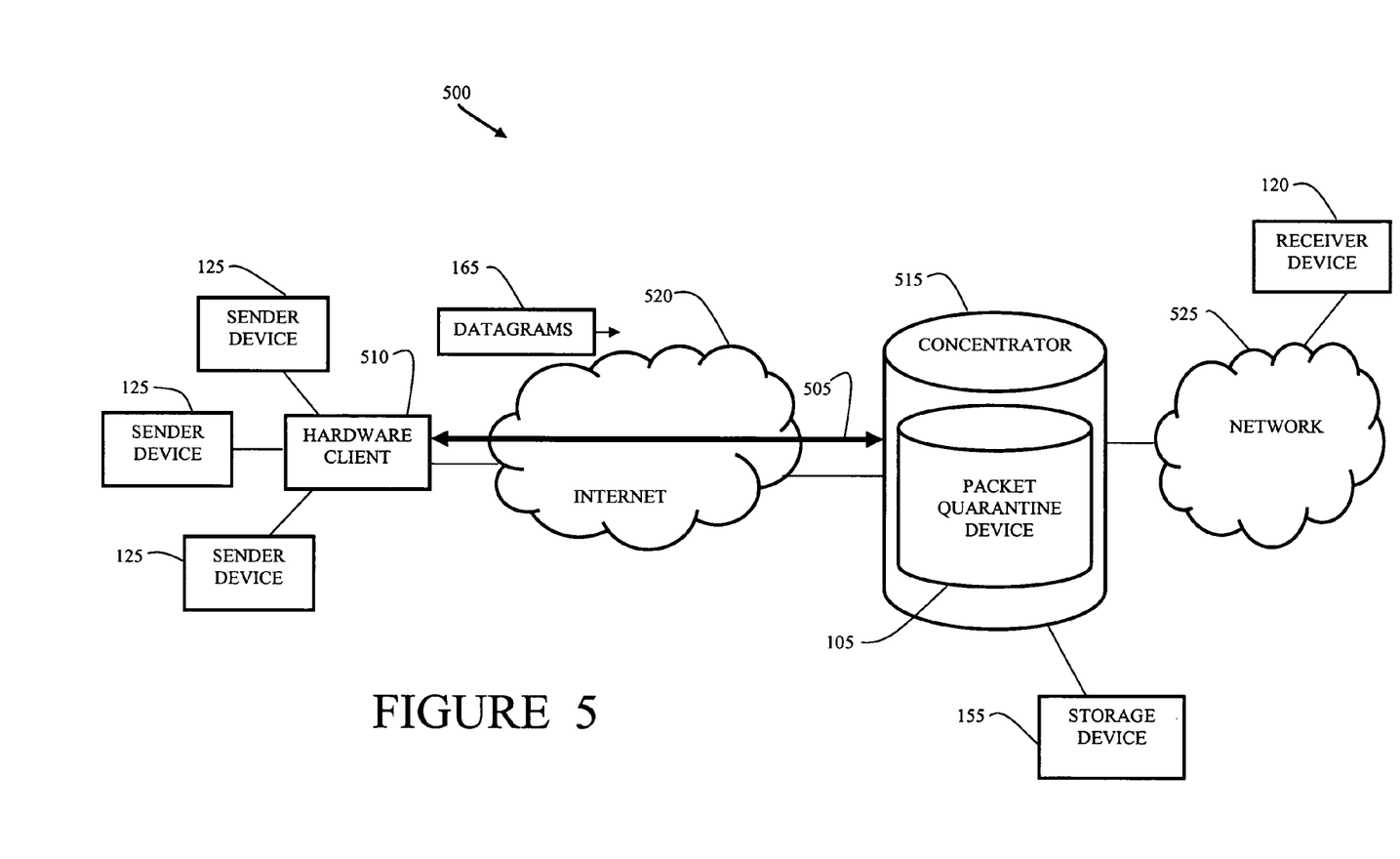
FIG. 5 is a block diagram of a computer network in which a VPN connection is implemented between a hardware client and a concentrator, the concentrator including a packet quarantine device according to principles of the present invention.

FIG. 5 is another example embodiment of the packet quarantine device 105 of the present invention. FIG. 5 shows a second computer network environment 500 in which a VPN connection 505 is implemented across the Internet 520 between a hardware client 510 and a concentrator 515. The hardware client 510 is, for example, a hardware client of the type available from Cisco Systems, Inc. of San Jose, Calif. The VPN connection 505 is, for example, a secure connection formed using the IPsec standard. Accordingly, the hardware client 510 and the concentrator 515 have negotiated security associations as shown in FIG. 1. The concentrator 515 includes a packet quarantine device 105 according to principles of the present invention. The hardware client 510 is connected to a plurality of sender devices 125. A storage device 155 is connected to the concentrator 515. A receiver device 120 is connected to the concentrator 515 over a network 525 such as a private network in a corporation.

In operation, the hardware client 510 transmits datagrams 165 from the sender devices 125 over the VPN tunnel 505. The packet quarantine device 105 in the concentrator 515 examines the datagrams 165 and stores invalid datagrams 165 in association with the security associations governing the VPN tunnel 505 to the storage device 155.

In an alternative embodiment of the invention, the hardware client 510 is implemented as a software client in a computerized device.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a packet quarantine processing method that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a packet quarantine device that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. In a computerized device, a method for providing network security, comprising the steps of:
   receiving a datagram over a connection using a connection-specific set of security parameters;
   performing a validation test on the datagram;
   if the datagram fails the validation test, saving the datagram in association with the set of security parameters to a storage device; and
   further comprising the steps of:
   if the datagram fails the validation test, performing an initial analysis of the datagram;
   formulating an alert including a result of the initial analysis of the datagram, the alert providing information for filtering datagrams; and
   transmitting the alert to a sending device sending datagrams to the computerized device, the alert instructing the sending device to filter datagrams having a specified Media Access Control address.

2. The method of claim 1 wherein the datagram is an Internet Protocol Security packet and the set of security parameters is a security association negotiated between a sending device and a receiving device.

3. The method of claim 1 wherein the step of receiving comprises receiving a plurality of datagrams; the step of performing a validation test further comprises performing the validation test on each of the plurality of datagrams; and the step of saving further comprises saving the plurality of datagrams in association with the set of security parameters.

4. The method of claim 1 wherein the connection has a plurality of connection-specific sets of security parameters wherein a first set of security parameters of said plurality is applied to said datagram.

5. The method of claim 4 further comprising the steps of:
   receiving a second datagram over the connection wherein a second set of security parameters of said plurality of connection-specific sets of security parameters is applied to said second datagram;
   performing the validation test on the second datagram; and
   if the second datagram fails the validation test, saving the second datagram in association with the second set of security parameters and further in association with the first set of connection-specific security parameters to the storage device.

6. The method of claim 1 wherein the connection is a virtual private network tunnel.

7. The method of claim 1 wherein the computerized device is a concentrator receiving datagrams from a hardware client in a virtual private network.

8. The method of claim 1 wherein the step of performing a validation test further comprises the steps of:
   decrypting a portion of the datagram; and
   validating an inner header of the datagram.

9. A system to provide security in a network, comprising:
   an interface device to receive a datagram over a connection using a connection-specific set of security parameters;
   a validation device coupled to the interface device, the validation device to perform a validation test on the datagram; and
   an exception device coupled to the validation device, the exception device to receive the datagram from the validation device if the datagram fails the validation test, the exception device to save the datagram in association with the set of security parameters to a storage device;
   wherein the system is implemented in a concentrator and the system receives the datagram from a hardware client;
   wherein the validation device further performs an initial analysis on the datagram and formulates an alert in response to the initial analysis, the alert to contain datagram filtering information; and
   wherein the interface device receives the alert from the validation device and transmits the alert to the hardware client, the alert to include instructions for the hardware client to drop datagrams from a sending device having a specified Media Access Control address.

10. The system of claim 9 wherein the validation device decrypts a portion of the datagram in order to perform the validation test on an inner datagram header.

11. The system of claim 9 wherein the exception device streams said datagram in association with the set of security parameters to a storage device.

12. The system of claim 9 wherein the datagram is an Internet Protocol security packet and the set of security parameters is a security association negotiated between a sending device and a receiving device.

13. The system of claim 9 wherein the connection is a virtual private network tunnel.

14. A system to provide security in a network, comprising:
   means for receiving a datagram over a connection using a connection-specific set of security parameters;
   means for performing a validation test on the datagram;
   means for saving the datagram in association with the set of security parameters to a storage device if the datagram fails the validation test;
   means for performing an initial analysis of the datagram if the datagram fails the validation test;
   means for formulating an alert including a result of the initial analysis of the datagram, the alert providing information for filtering datagrams; and
   means for transmitting the alert to a sending device sending datagrams to the computerized device, the alert instructing the sending device to filter datagrams having a specified Media Access Control address.

15. A computer program product having a computer-readable medium including computer program logic encoded thereon that, when performed on a computer system having a coupling of a memory, a processor, and at least one communications interface, provides a method for providing security to a network by performing the operations of:
   receiving a datagram over a connection using a connection-specific set of security parameters;
   performing a validation test on the datagram;
   if the datagram fails the validation test, saving the datagram in association with the set of security parameters to a storage device; and
   further comprising:
   if the datagram fails the validation test, performing an initial analysis of the datagram;
   formulating an alert including a result of the initial analysis of the datagram, the alert providing information for filtering datagrams; and transmitting the alert to a sending device sending datagrams to the computerized device, the alert instructing the sending device to filter datagrams having a specified Media Access Control address.

16. The method of claim 1, wherein:

receiving comprises receiving the datagram over the secure connection using the connection-specific set of security parameters, the datagram encrypted according to the connection-specific set of security parameters;

performing a validation test on the datagram comprises:
    utilizing the connection-specific set of security parameters to decrypt the datagram, and
    verifying header information associated with the datagram; and saving comprises, if the datagram fails the validation test, saving the datagram and the associated set of security parameters to a storage device.

17. The method of claim 16, further comprising:
retrieving the datagram and the associated set of security parameters from a storage device;
decrypting the datagram using the associated set of security parameters; and
detecting network error conditions based upon the decrypted datagram.

18. The method of claim 1, wherein:
performing the analysis of the datagram comprises:
    if the datagram fails the validation test, retrieving the datagram and the connection-specific set of security parameters from the storage location;
    decrypting a header of the datagram; and
    detecting an identity of a device transmitting the datagram based upon the decrypted header.

* * * * *